Jan. 28, 1936. C. F. GILLETTE 2,028,975

COMPOSITE PICTURE

Original Filed Sept. 2, 1931

INVENTOR
CLYDE F. GILLETTE
BY W E Beatty
ATTORNEY

Patented Jan. 28, 1936

2,028,975

UNITED STATES PATENT OFFICE 2,028,975

COMPOSITE PICTURE

Clyde F. Gillette, New York, N. Y., assignor to United Research Corporation, Long Island City, N. Y., a corporation of Delaware Original application September 2, 1931, Serial No. 560,746. Divided and this application February 28, 1934, Serial No. 713,325

2 Claims. (Cl. 88—16)

This invention relates to composite pictures, and particularly to a process for combining a foreground subject with a separately photographed background subject in a single photographic print such as a motion picture film.

Generally speaking, this invention relates to the matte type of a composite shot, wherein a matte is employed to block out of a background film a portion where a foreground is to appear. Numerous methods have heretofore been proposed for accomplishing this. Instead of referring to the prior practices in detail, it may be said in general that the object of the present invention is to simplify the production and use of the matte.

This application is a division of my application Serial No. 560,746 filed September 2, 1931 for Composite photographic processes.

For further details of the invention reference may be made to the drawing wherein Fig. 1 is a plan view, partly diagrammatic, of apparatus for practicing the process of this invention.

Figure 1:
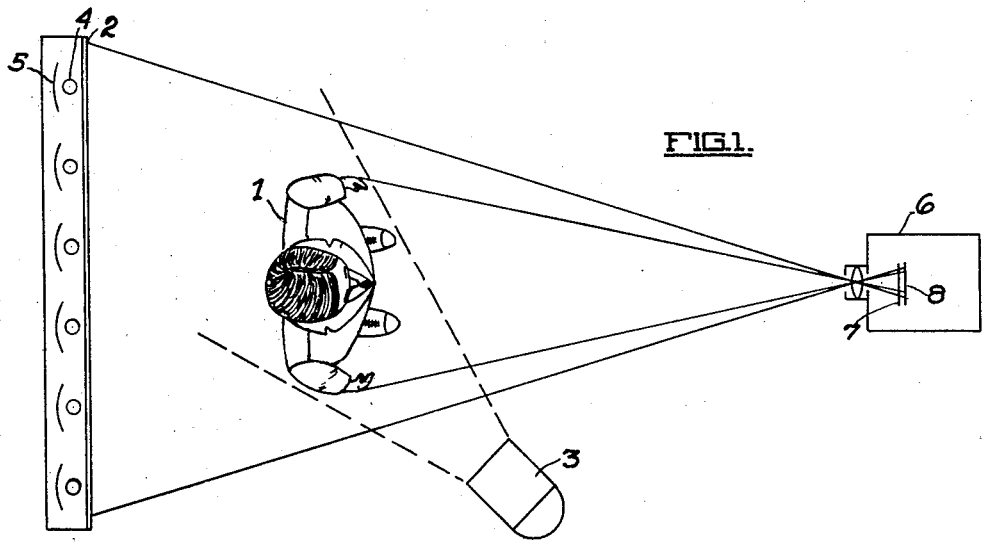

Referring to Fig. 1, the foreground component, here shown as an actor 1, is arranged before a luminous plain ground 2, the former being illuminated by a lamp or the like 3, light from which should not strike the ground 2, and the latter, that is the screen 2, being illuminated by the mercury arc lamps or other light sources 4 arranged in front of reflectors such as 5. The reflectors 5 serve to spread the light from the sources 4 over the back of the translucent ground 2, to thereby provide a highly luminous ground behind the actor 1. The actor 1 or other foreground component, and the ground 2 thus arranged and illuminated are photographed by the camera 6 which contains two films, the front film 7 being an ordinary negative, and the back film 8 being a slow working high contrast emulsion, such as contrast printing stock.

The intensity of illumination of the ground 2 is much higher than the intensity of illumination of the foreground 1.

It should be understood that the films 7 and 8 are progressed in register together through the camera 6, by mechanism well understood in the art and that this camera as well as the camera or printer employed for all subsequent printing operations is provided with a shuttle having accurate register pins.

Figure 2:
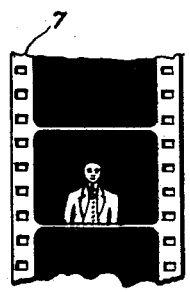
Fig. 2 is a view of a negative obtained from the foreground subject.
Figure 3:
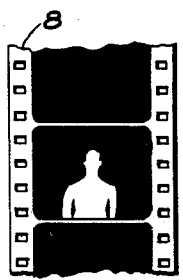
Fig. 3 is a view of the matte obtained from the screen.

Photographing as indicated in Fig. 1 may then be conducted in the usual way, whereupon a foreground negative according to Fig. 2 is obtained upon development, the foreground subject being shown in ordinary density and contrast, with an opaque surrounding portion. Simultaneously with the exposure of film 7 shown in Fig. 2, the film 8 shown in Fig. 3 is exposed by light transmitted through film 7 to produce upon development an opaque portion surrounding the silhouette of the foreground as shown in Fig. 3. This result is obtained because of the fact that ordinary illumination upon the subject 1 is too low in level to affect the film 8, especially after a portion of it has been absorbed by the film 7, whereas the light intensity from the ground 2 is still sufficiently high, even though partly absorbed by the film 7, to give a sufficient exposure to the film 8.

Figure 4:
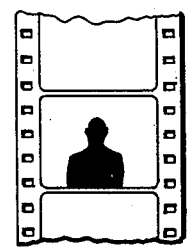
Fig. 4 is a view of the reverse matte produced from the matte of Fig. 3.

A print is then made of the film of Fig. 3 to produce the matte in Fig. 4 having an opaque portion within the silhouette of the subject 1.

Figure 5:
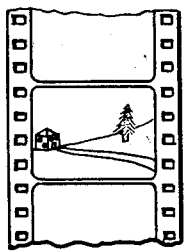
Fig. 5 is a view of a background negative.
Figure 6:
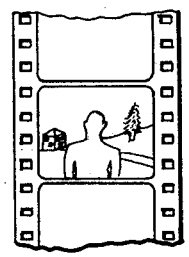
Fig. 6 is a view indicating the character of the latent image upon a film produced by printing the matte of Fig. 4 and the background negative of Fig. 5 in register.
Figure 7:
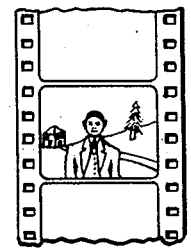
Fig. 7 is a view of the composite picture obtained by printing the negative of Fig. 2 upon the film of Fig. 6, after development.

The background negative of Fig. 5 may then be printed in register with the matte of Fig. 4 to produce the latent image of Fig. 6 which has a matted out portion corresponding to the subject 1. Thereafter the film of Fig. 2 is printed upon the film of Fig. 6 to produce the print of Fig. 7.

It will be apparent that various modifications may be made in the invention without departing from the spirit of the appended claims.

Having thus described the invention, what is claimed as new and desired to secure by Letters Patent, is:

1. The process of photographing which comprises arranging sensitive photographic material in front of less sensitive photographic material, illuminating a foreground subject at a luminosity level appropriate for producing a half tone print upon said sensitive photographic material, but insufficient for exposing said less sensitive photographic material thus arranged, simultaneously illuminating a plain ground behind said foreground subject at a higher intensity level such that an exposure can be produced thereby upon said less sensitive photographic material, and exposing the superimposed sensitive and less sensitive materials to said foreground and said plain ground thus arranged and illuminated.

2. The process according to claim 1 which comprises developing said exposed superimposed films and employing the same to produce a composite motion picture.

CLYDE F. GILLETTE.